United States Patent [19]

Ely et al.

[11] Patent Number: 5,161,838
[45] Date of Patent: Nov. 10, 1992

[54] LOCKING ASSEMBLY

[75] Inventors: Timothy B. Ely; Frederick P. Finck, both of Fairfield; George Shimko, Norwalk, all of Conn.

[73] Assignee: The Highfield Mfg. Company, Bridgeport, Conn.

[21] Appl. No.: 794,873

[22] Filed: Nov. 19, 1991

[51] Int. Cl.⁵ .............................................. B65D 33/34
[52] U.S. Cl. .................................................... 292/327
[58] Field of Search ............... 292/307, 308, 315, 316, 292/317, 327, 323

[56] References Cited

U.S. PATENT DOCUMENTS

| | | | |
|---|---|---|---|
| 393,688 | 11/1888 | Brooks | 292/327 |
| 2,319,753 | 5/1943 | Smith et al. | 292/327 X |
| 3,867,822 | 2/1975 | Morse et al. | 292/256.67 X |
| 3,980,337 | 9/1976 | Moberg et al. | 292/319 |
| 4,225,165 | 9/1980 | Kesselman | 292/256.67 |
| 4,280,726 | 7/1981 | McCoag | 292/327 |
| 4,802,699 | 2/1989 | Smith | 292/327 |
| 4,802,700 | 2/1989 | Stevenson et al. | 292/327 |
| 4,936,612 | 6/1990 | Kohn | 292/327 |
| 5,005,883 | 4/1991 | Guiler | 292/327 |

FOREIGN PATENT DOCUMENTS 263455 12/1949 Switzerland .

Primary Examiner—Richard E. Moore
Attorney, Agent, or Firm—Lorusso & Loud

[57] ABSTRACT

A locking assembly adapted for locking first and second members together, the assembly including a housing member and a stud member, the housing member being adapted to receive the stud member and permanently lock the stud member in the housing member, the assembly including a frangible portion, such that a part of the assembly is adapted to be broken away from a remainder of the assembly to permit removal of the assembly from the first and second members.

9 Claims, 9 Drawing Sheets

LOCKING ASSEMBLY

BACKGROUND OF THE INVENTION

1. Field of the Invention

The invention relates to locking devices and is directed more particularly to a destructible locking assembly for use in conjunction with utility meter ring members, gas service valves, and similar devices.

2. Description of the Prior Art

To prevent tampering with utility meters, or the like, it is customary that a cover member, often of transparent glass, be placed over the face of the meter and secured to a meter box by a metal ring. The ring includes two flanges which extend outwardly from the ring substantially parallel to each other. Typically, the flanges are provided with holes enabling an operator to place a padlock through the holes for locking the flanges together to fix the ring to the meter, thereby locking in place the glass cover.

Unfortunately, those who are so inclined often are able to either secure a key appropriate for opening the lock, or obtain access to the meter by "picking" the lock. In either case, the lock usually is returned to the closed condition, without any indication of tampering having taken place. The utility meter reader then has no way to tell that the meter reading has been altered.

Accordingly, a locking device which could not be opened by a key and which would provide a readily visible sign of having been tampered with, would be beneficial to the utility industry.

SUMMARY OF THE INVENTION

It is, therefore, an object of the invention to provide a locking assembly for a utility meter, the locking assembly being such as to require destruction of a portion thereof, which destruction is readily apparent.

A further object of the invention is to provide as a portion of a locking assembly a locking device which is frangible and which, once opened by destruction thereof, is not adaptable to being returned to its normal appearance.

A still further object of the invention is to provide a locking device which is frangible and which is of such low cost as to render routine destruction thereof to gain legitimate access to the protected meter an acceptable cost.

With the above and other objects in view, as will hereinafter appear, a feature of the present invention is the provision of a locking device adapted for locking first and second members together, the device comprising a housing member and a stud member, the housing member having a body portion and a flange portion, the body portion having a cavity therein, the stud member comprising a shaft portion and a collar portion, the housing member body portion cavity being adapted to receive the stud member shaft portion and permanently lock the stud member shaft portion in the housing member body portion cavity with the first and second members disposed between the housing member flange portion and the stud member collar portion, the device having a frangible portion, whereby a part of the device is adapted to be broken away from a remainder of the device to facilitate removal of the device from the first and second members.

In accordance with a further feature of the invention, there is provided a utility meter locking assembly comprising a ring member having first and second ends, a first flange extending from the first end of the ring member and a second flange extending from the second end of the ring member, the two flanges extending outwardly from the ring member and generally parallel to each other, a locking device for locking the first and second flanges together, the locking device comprising a stud member and a housing member adapted to be permanently interengaged, and tool means adapted to release the flanges from each other by deformation of the locking device.

The above and other features of the invention, including various novel details of construction and combination of parts, will now be more particularly described with reference to the accompanying drawings and pointed out in the claims. It will be understood that the particular device and assembly embodying the invention is shown by way of illustration only and not intended as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
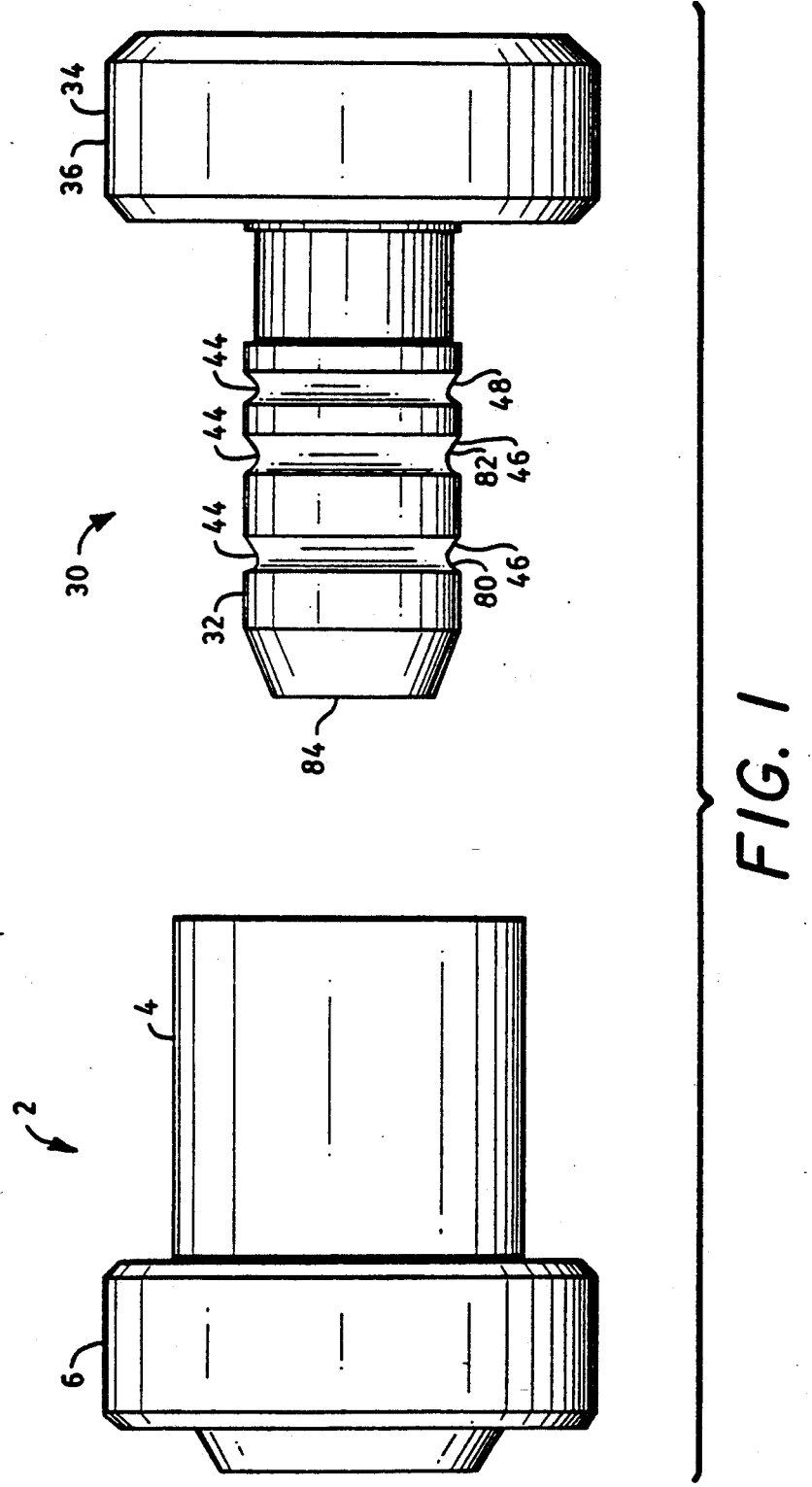
FIG. 1 is an exploded elevational view of one form of locking assembly illustrative of an embodiment of the invention.
Figure 2:
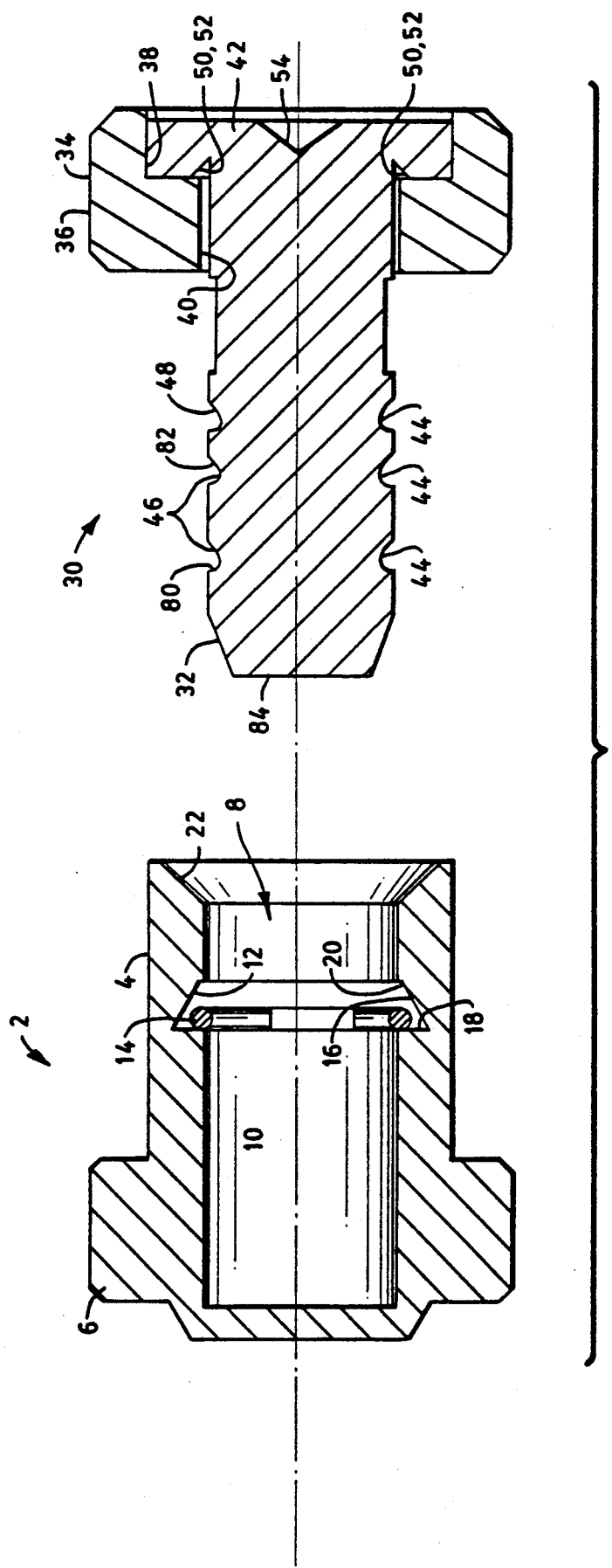
FIG. 2 is an exploded centerline sectional view of the locking assembly shown in FIG. 1.
Figure 3:
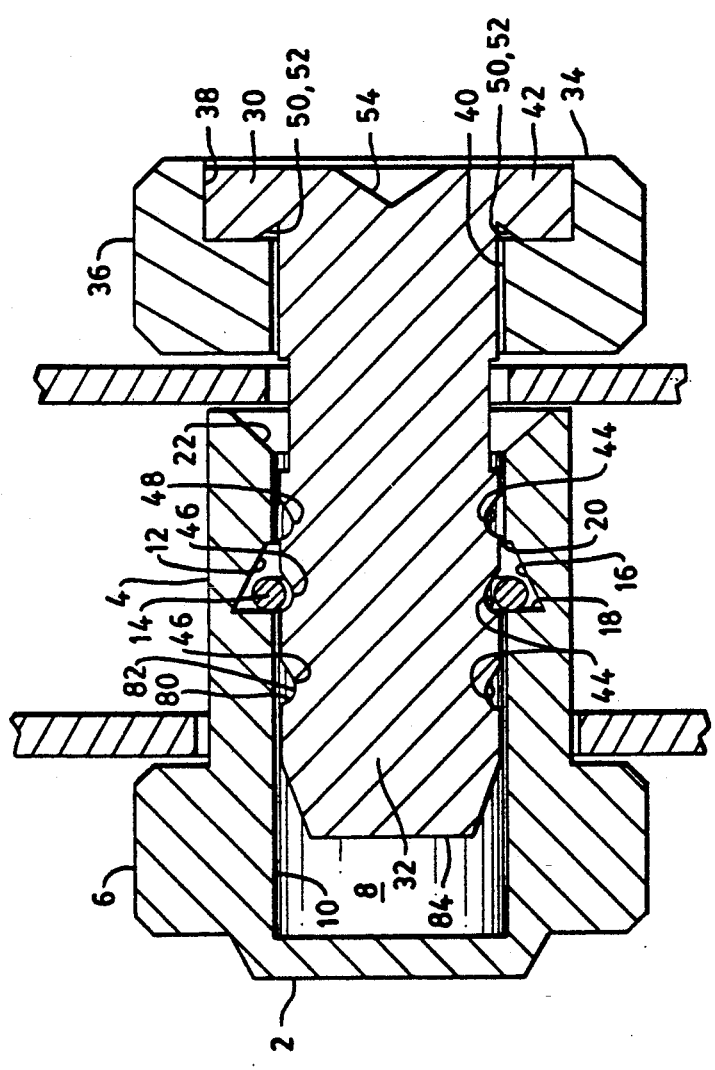
FIG. 3 is a sectional view of the locking assembly, similar to FIG. 2, but showing the assembly components joined together.
Figure 4:
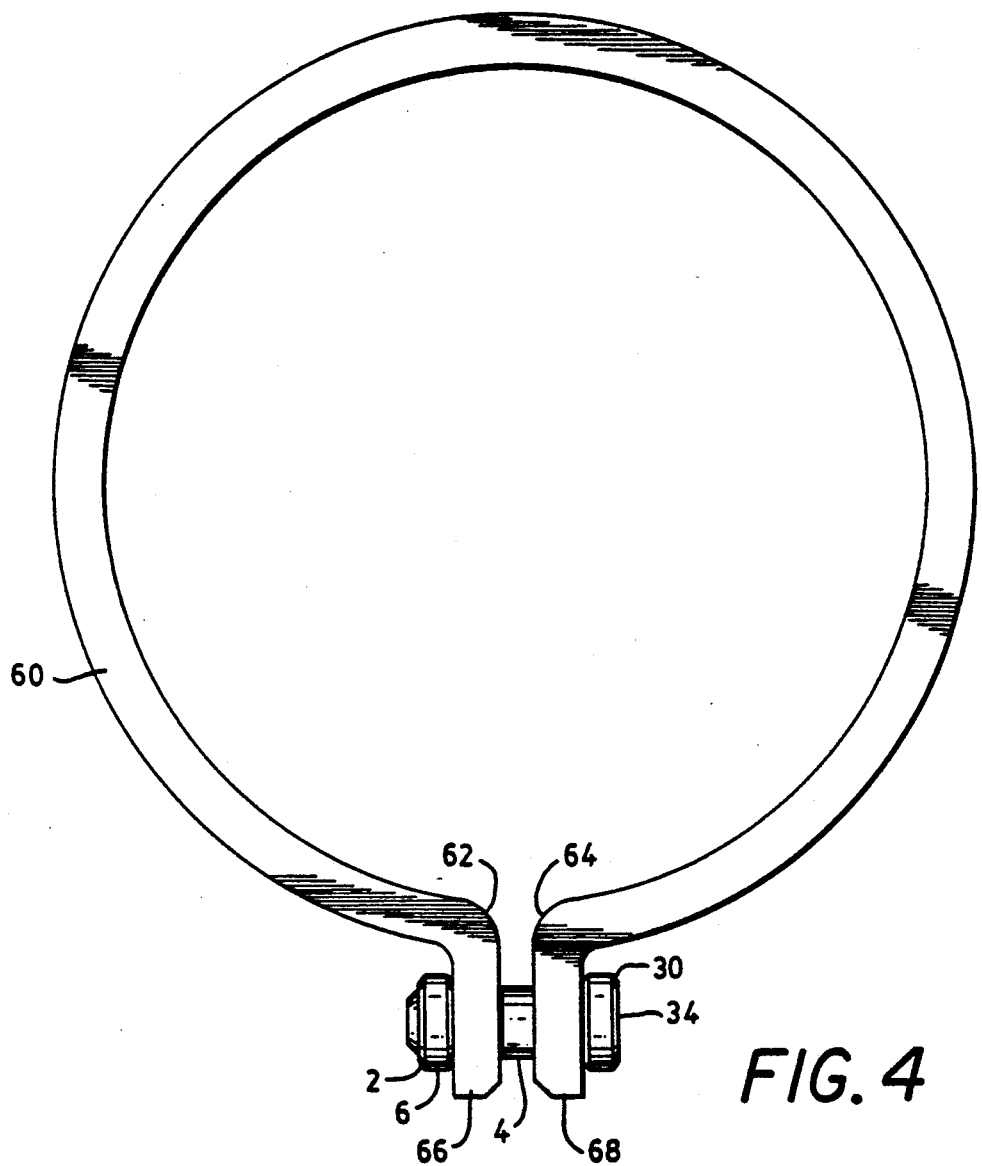
FIG. 4 is a plan view of a locking ring member for a utility meter locking assembly in combination with the locking assembly of FIGS. 1-3.
Figure 5:
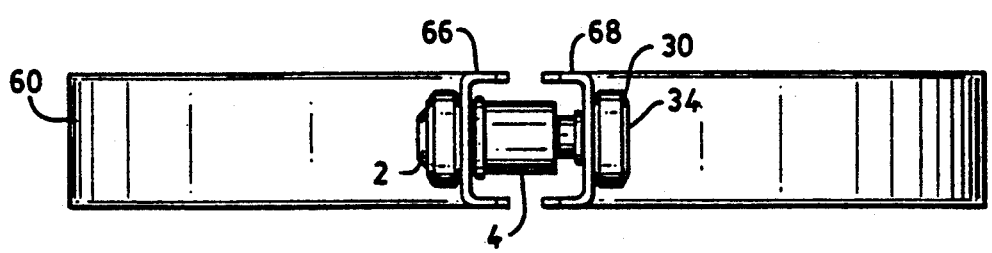
FIG. 5 is a front elevational view of the locking ring member and locking assembly shown in FIG. 4.
Figure 6:
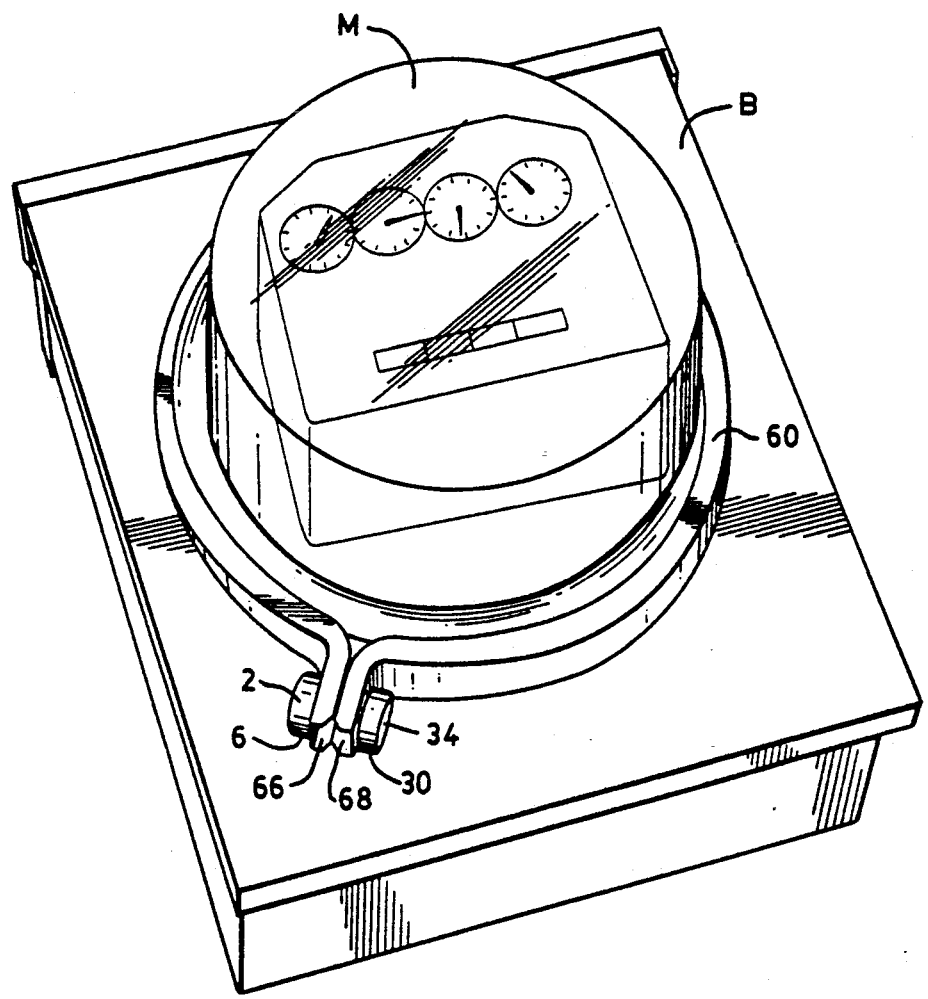
FIG. 6 is a perspective view of a utility meter with the combination of locking ring member and locking assembly of FIGS. 4 and 5 thereon.
Figure 7:
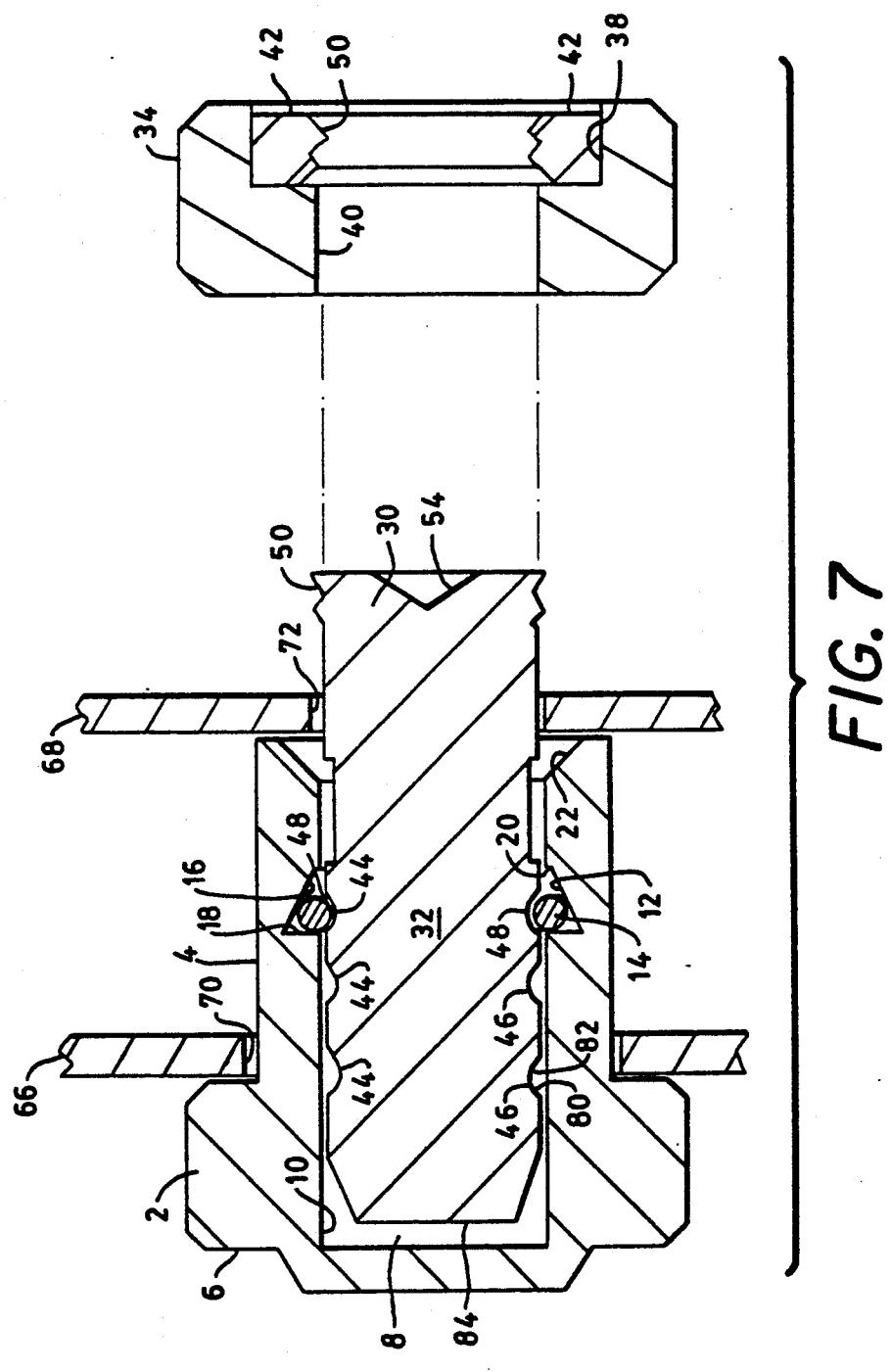
FIG. 7 is a sectional view of the locking assembly shown in FIG. 3, but showing the assembly in its broken and releasable condition.
Figure 8:
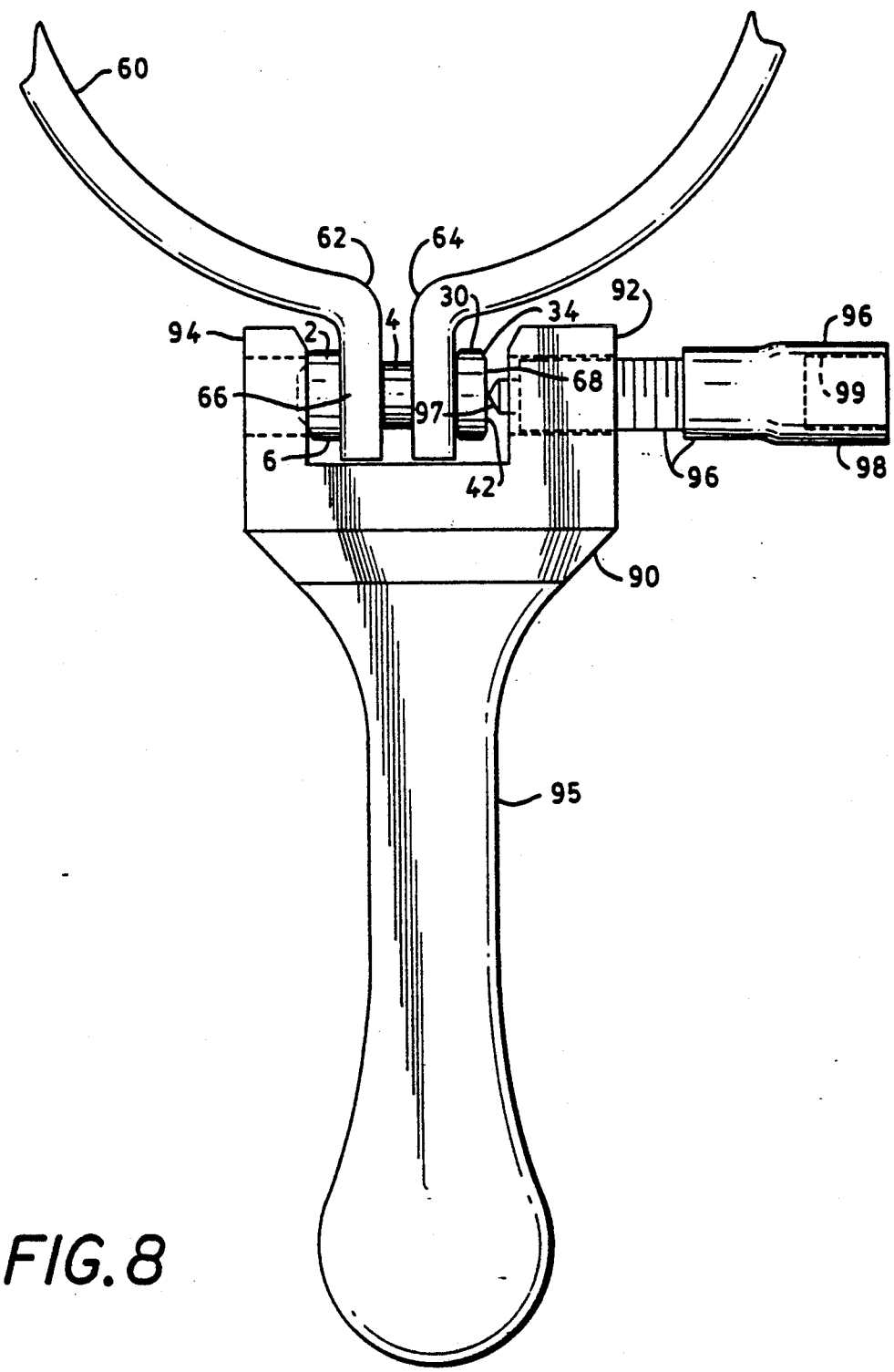
FIG. 8 is an elevational view of a tool used to break and release the locking assembly.
Figure 9:
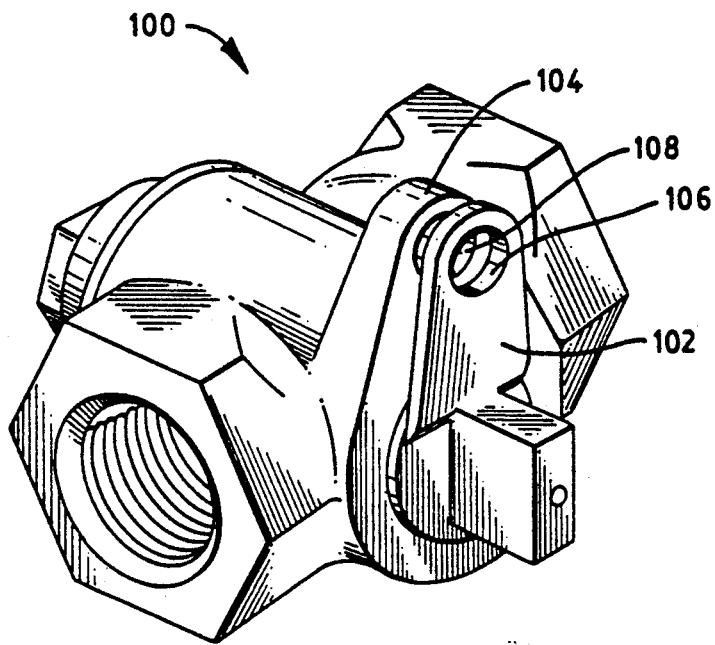
FIG. 9 is a perspective view of a gas service valve of the type with which the invention finds utility.

Referring to the drawings, it will be seen that a locking device illustrative of the invention includes a housing member 2 having a body portion 4 and a flange portion 6. The body portion 4 has a cavity 8 therein defined by an inside wall 10. The inside wall 10 is provided with a circular groove 12 which retains a snap ring 14.

The circular groove 12 has an inclined wall 16. A larger diameter of the circular groove 12 is on a side 18 of the circular groove closer to the flange portion 6, and a smaller diameter of the circular groove is on a side 20 of the circular groove further from the flange portion 6. Accordingly, when the snap ring 14 is urged in a direction away from the flange portion 6, or towards an opening 22 of the cavity 8, the snap ring is urged inwardly of the cavity 8 by the circular groove inclined wall 16.

The locking assembly further includes a stud member 30 having a shank portion 32 and a collar portion 34. The collar portion 34 includes a collar member 36 having an annular recess 38 therein adjacent a central opening 40 therethrough. The collar portion 34 further includes a head portion 42 of the shank portion 32, which head portion 42 is disposed at one end of the shank portion 32, extends through the collar member central opening 40, and is disposed in the annular recess 38 of the collar member 36.

The shank portion 32 is provided with at least one circumferential groove 44 (three such grooves are illustrated in the drawings) adapted to receive the snap ring 14 disposed in the housing member body portion cavity 8.

In accordance with the invention, the locking device is provided with a frangible portion, such that a portion of the device is adapted to be broken away from a remainder of the device. In the illustrative embodiment, the stud member 30 is provided with a frangible portion 50. The head portion 42 of the shank portion 32 is provided with groove means 52 at the juncture of the shank portion 32 and the head portion 42. The head portion 42 may be further provided with a recess 54 adapted to receive a pressure-applying tool for breaking the frangible portion 50 of the stud member 30.

The above-described locking device may be used in conjunction with a ring member 60 adapted to fit about a utility meter cover portion M and lock the cover portion M to a meter box B. The ring member 60 is provided with first and second ends 62, 64, with a first flange 66 extending from the first ring member end 62 and a second flange 68 extending from the second ring member end 64. The first and second flanges 66, 68 extend outwardly from the ring member 60 and generally parallel to each other. The first and second flanges 66, 68 are, respectively, provided with holes 70, 72 extending therethrough, the holes 70, 72 being readily alignable to receive the above-described locking assembly.

In operation, the housing member body portion 4 is inserted into the first flange hole 70 and the stud member shank portion 32 is inserted through the second flange hole 72 and into the housing member cavity 8. The snap ring 14 partially enters a circumferential groove 44 to lock the stud member 30 to the housing member 2, with the ring member first and second flanges 66, 68 disposed between the housing member flange portion 6 and the stud member collar portion 34. The circumferential groove 44 includes a first wall portion 80 generally normal to the outside wall of the shank portion 32, and a second wall portion 82 sloping to the outside wall of the shank portion, with the first wall portion 80 being closer to a distal end 84 of the shank portion 32, and the second wall portion 82 being further from the distal end 84 of the shank portion, such that the snap ring 14 is adapted to move out of the circumferential groove 44 by sliding along the second wall portion 82, but is restrained from moving out of the circumferential groove when engaged by the first wall portion 80. Thus, the shank portion 32 easily may be pushed further into the cavity 8, but cannot be withdrawn from the cavity once the snap ring 14 has engaged the circumferential groove. Preferably, the shank portion 32 is provided with a plurality of circumferential grooves 44 (three shown in the drawings) such that the snap ring 14 may settle in the circumferential groove permitting the most snug fitting of the flange portion 6 and the collar portion 34 about the ring member flanges 66, 68.

As noted above, once the snap ring 14 enters a circumferential groove 44, the two members 2, 30 may be urged closer together, but cannot be pulled apart. An attempt to pull the members 2, 30 apart results in the snap ring being urged by the inclined wall 16 inwardly of the shank portion 32, more firmly locking the two members together.

To part the members 2, 30 requires destruction of the locking device. To that end, there is provided a pressure-applying tool 90 adapted to break the frangible portion 50 of the stud member 30, whereby to release the ring member flanges 66, 68 to permit removal of the ring member 60. The tool 90 includes first and second arms 92, 94 extending from a handle portion 95, and a plunger member 96 mounted in the first arm 92 and movable toward the second arm 94. The stud member recess 54 is adapted to receive an end 97 of the plunger member 96 while the locking device is disposed between the tool means second arm 94 and the plunger end 97. Movement of the plunger member 96 toward the second arm 94 is operative to break the frangible portion 50 of the stud member, separating the collar portion 34 from the shank portion 32 and permitting withdrawal of the housing member 2 and shank portion 32 from the ring member flanges 66, 68. One end 98 of the plunger member 96 may be provided with means, such as a socket 99, for receiving a wrench or power tool means (not shown) suitable for threadedly turning, or otherwise axially moving the plunger member 96 to cause its axial movement against the stud member head portion 42 to cause breakage at the stud member frangible portion 50.

Accordingly, to gain access to the meter, the locking device must be deformed and, once deformed, such deformation is permanent and quite observable.

In a preferred embodiment, illustrated in the drawings, the shank portion 32 of the stud member 30 is provided with three of the circumferential grooves 44, two of the grooves 46 being available to interconnect the stud member 30 and the housing member 2, and a third groove 48 being used for retention of the shank portion 32 deep in the housing cavity 8 after the shank portion's having been forced deeply into the cavity by the operation of the tool 90. With the shank portion 32 retained deeply within the housing cavity 8, reattachment of the broken away parts to the shank portion is rendered most difficult.

Figure 10:
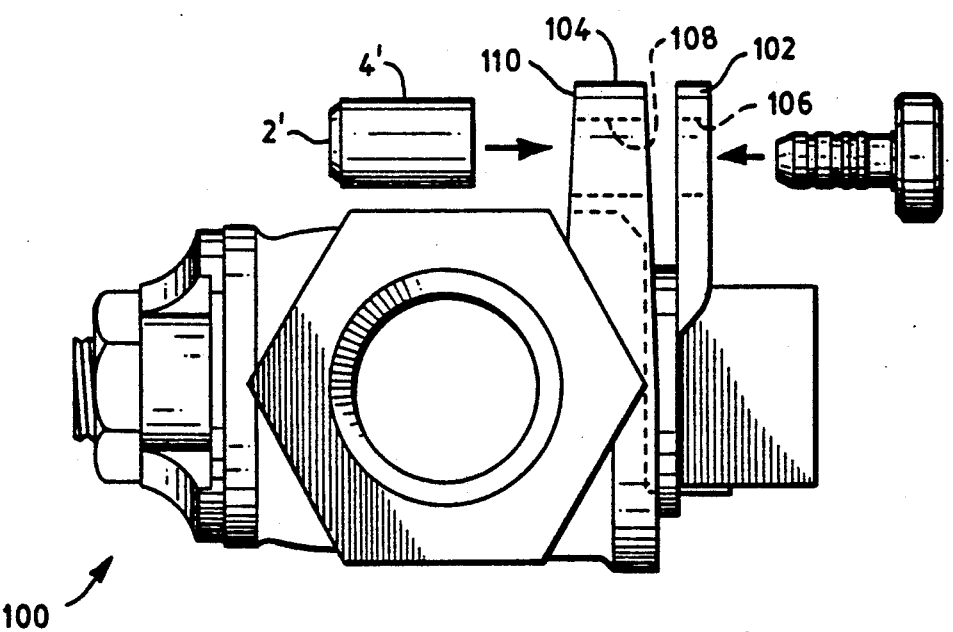
FIG. 10 is a side elevational view of the gas service valve of FIG. 9, shown with a locking assembly illustrative of an alternative embodiment of housing member.

FIG. 10 illustrates use of the inventive locking assembly with a gas service valve 100 in which the valve is opened by rotation of a first flange member 102 relative to a second flange member 104. As in the case of the utility meter ring member 60, the two flanges are provided with holes 106, 108, respectively, extending therethrough and readily alignable to receive the above-described locking assembly.

FIG. 10 further illustrates an alternative embodiment of housing member 2' having a body portion 4' which itself is larger in diameter than the hole 108 and therefore serves as a flange in that the body portion 4' is adapted to bear against a surface 110 of the flange member 104.

Figure 11:
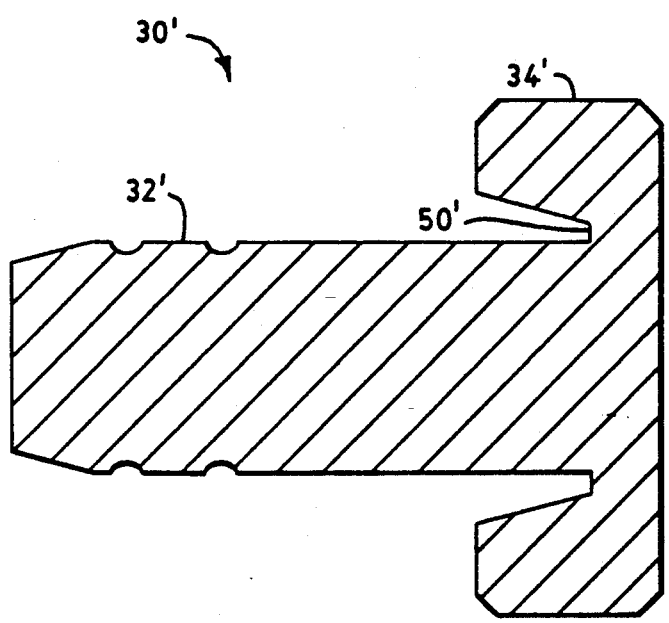
FIG. 11 is a side elevational view of an alternative embodiment of stud member.

In FIG. 11, there is disclosed an alternative embodiment of stud member 30' in which the shank portion 32' and the collar portion 34' are integral. Frangible portions 50' facilitate breaking apart of the shank and collar portions 32', 34' from each other.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A locking assembly adapted for locking first and second members together, said assembly comprising a housing member and a stud member, said housing member having a body portion having a cavity therein, said housing member body portion being provided with a circular groove in the inside wall of said cavity, a snap ring disposed in said groove, said stud member comprising a shank portion and a collar portion, said shank portion being provided with a circumferential groove adapted to receive said snap ring, said housing member body portion cavity being adapted to receive said stud member shank portion and permanently lock said stud member shank portion in said housing member body portion cavity by said snap ring entering said shank portion circumferential groove, with said first and second members disposed between said housing member body portion and said stud member collar portion, said collar portion comprising a collar member having an annular recess therein adjacent a central aperture therethrough, a head portion of said shank portion at one end of said shank portion being disposed in said recess, said head portion having groove means at its juncture with said shank portion, such that said head portion is adapted to break away at said groove means from said shank portion, facilitating the parting of said collar portion from said stud portion, and the removal of said assembly from said first and second members.

2. The locking assembly in accordance with claim 1 wherein said body portion is provided with a flange portion, said body portion circular groove having an inclined wall, a larger diameter of said circular groove being on a side of said circular groove closer to said flange portion, and a smaller diameter of said circular groove being on a side of said circular groove further from said flange portion, such that said wall inclines inwardly toward said cavity inside wall and away from said flange portion, whereby upon movement of said snap ring in said circular groove in a direction away from said flange portion, said inclined wall is adapted to urge said snap ring further into said body member cavity and into said shank portion circumferential groove.

3. The locking assembly in accordance with claim 2 wherein said shank portion circumferential groove includes a first wall portion generally normal to the outside wall of said shank portion and a second wall portion sloping to said outside wall of said shank portion, said first wall portion being closer to a distal end of said shank portion of said stud member and said second wall being closer to said collar portion of said stud member, whereby said snap ring is adapted to move out of said circumferential groove by sliding along said second wall portion but is restrained from moving out of said circumferential groove when engaged with said first wall portion.

4. A locking assembly adapted for locking first and second members together, said assembly comprising a housing member and a stud member, said housing member having a body portion having a cavity therein, said housing member body portion being provided with a circular groove in the inside wall of said cavity, a snap ring disposed in said groove, said stud member comprising a shank portion and a collar portion, said shank portion being provided with a circumferential groove adapted to receive said snap ring, said housing member body portion cavity being adapted to receive said stud member shank portion and permanently lock said stud member shank portion in said housing member body portion cavity by said snap ring entering said circumferential groove, with said first and second members disposed between said housing member body portion and said stud member collar portion, said stud member having a frangible portion disposed in said collar portion, such that upon breaking of said frangible portion of said collar portion, said collar portion is adapted to part from said stud member shank portion, to facilitate removal of said assembly from said first and second members, said collar portion being provided with a recess adapted to receive a pressure-applying tool for breaking of said frangible portion of said collar portion.

5. A locking assembly comprising:
a ring member adapted to fit about a cover portion, said ring member having first and second ends, a first flange extending from said first ring member end and a second flange extending from said second ring member end, said first and second flanges extending outwardly from said ring member generally parallel to each other, and locking means for locking said first and second flanges together, said locking means comprising a stud member and a housing member adapted to be permanently interengaged, said stud member comprising a shank portion and a collar portion, and said housing member comprising a body portion having a cavity therein adapted to receive said stud member shank portion and lockingly retain said shank portion therein with said first and second flanges locked between said housing member body portion and said stud member collar portion, said housing member body portion having a circular groove in the inside wall of said cavity, a snap ring disposed in said circular groove, said shank portion having a circumferential groove adapted to receive said snap ring to lock said housing member and said stud member together, said locking means having a frangible portion, said frangible portion being disposed in said collar member, said collar member having an annular recess therein adjacent a central aperture therethrough, a head portion of said shank portion at one end of said shank portion being disposed in said recess, said head portion having groove means at its juncture with said shank portion, said groove means defining said frangible portion, such that said head portion is adapted to break away at said groove from said shank portion, facilitating the parting of said collar portion from said stud portion, and said locking means having recess means therein for receiving a pressure-applying tool for breaking of said frangible portion 6. A locking assembly comprising a ring member having first and second ends, a first flange extending from said first end and a second flange extending from said second end, said first and second flanges extending outwardly from said ring member and generally parallel to each other, locking means for locking said first and second flanges together, said locking means comprising a stud member and a housing member adapted to be permanently interengaged, said housing member comprising a flange portion, a tubular body portion extending from said housing member flange portion, said body portion having an open-ended cavity therein and a circular groove internally thereof, and a snap ring member disposed in said circular groove, said stud member comprising a shank portion and a collar portion fixed to a first end of said shank portion, said shank portion having circumferential groove means therein, said housing member body portion being adapted to receive said stud member shank portion, said shank portion circumferential groove means being adapted to receive in part said housing member snap ring to lock said housing member and said stud member together, tool means adapted to release said flanges from each other by deformation of said locking means, said locking means including a frangible portion and said deformation of said locking means comprising breaking of said frangible portion, said locking means being adapted to receive said tool means, said tool means comprising first and second arms extending from a handle portion, and a plunger member disposed in one of said arms and axially movable toward the other of said arms, a locking means recess being adapted to receive an end of said plunger member of said tool means while said locking means is disposed between said tool means other arm and said plunger member, movement of said plunger member toward said other arm being operative to break said frangible portion of said locking means.

7. A locking assembly adapted for locking first and second members together, said assembly comprising a housing member and a stud member, said housing member having a body portion having a cavity therein, said housing member body portion having a circular groove in the inside wall of said cavity, a snap ring disposed in said groove, said stud member comprising a shank portion and a collar portion, said shank portion having a circumferential groove adapted to receive said snap ring, said housing member body portion cavity being adapted to receive said stud member shank portion with said snap ring permanently locking said stud member shank portion in said housing member body portion cavity with said first and second members disposed between said housing member body portion and said stud member collar portion, said stud member having a frangible portion, said frangible portion being disposed in said collar portion, such that upon breaking of said frangible portion of said collar portion, said collar portion is adapted to part from a remainder of said stud member, said stud member comprising a single unitary member having as integral portions thereof said shank portion and said collar portion, said collar portion being disposed at one end of said shank portion and extending radially outwardly from said shank portion, said frangible portion comprising an annular recess in said collar portion adjacent said shank portion, said recess being formed in part by a wall of said shank portion, whereby said collar portion of said stud member is adapted to be broken away from said remainder of said stud member to facilitate removal of said assembly from said first and second members.

8. The locking assembly in accordance with claim 1 in which said housing member body portion includes an enlarged portion extending radially outwardly from the remainder of said body portion.

9. The locking assembly in accordance with claim 8 wherein said enlarged portion comprises a flange portion disposed at one end of said body portion.

* * * * *